United States Patent [19]

Ruyten et al.

[11] Patent Number: 5,217,180
[45] Date of Patent: Jun. 8, 1993

[54] MAGNETIC TAPE APPARATUS HAVING A DIFFERENTIAL BRAKING MECHANISM WITH A BUCKLING SPRING MEMBER

[75] Inventors: Henricus Ruyten, Gumpoldskirchen; Peter Landbauer, Mödling, both of Austria

[73] Assignee: U.S. Philips Corporation, New York, N.Y.

[21] Appl. No.: 712,220

[22] Filed: Jun. 7, 1991

[30] Foreign Application Priority Data

Jun. 21, 1990 [AT] Austria ............................. 1325/90

[51] Int. Cl.⁵ .................... G11B 15/32; F16D 51/00
[52] U.S. Cl. ........................................ 242/204; 188/74; 188/82.6; 242/201
[58] Field of Search ................ 242/203, 204, 201; 188/74, 83, 82.1, 82.3, 82.34, 82.6, 166; 267/158; 360/132

[56] References Cited

U.S. PATENT DOCUMENTS

| | | | |
|---|---|---|---|
| 3,052,421 | 9/1962 | Fischer | 242/204 X |
| 3,664,609 | 5/1972 | McMillin, Jr. | 242/204 |
| 4,223,855 | 9/1980 | Briedis | 242/204 |
| 4,669,686 | 6/1987 | Huber et al. | 242/204 |

FOREIGN PATENT DOCUMENTS

| | | | |
|---|---|---|---|
| 573181 | 3/1959 | Canada | 267/158 |
| 1272646 | 7/1968 | Fed. Rep. of Germany . | |
| 0117928 | 7/1984 | Japan | 267/158 |
| 390570 | 7/1973 | U.S.S.R. | 242/204 |
| 441587 | 8/1974 | U.S.S.R. | 242/204 |

Primary Examiner—Daniel P. Stodola
Assistant Examiner—John F. Rollins
Attorney, Agent, or Firm—Brian J. Wieghaus

[57] ABSTRACT

To drive the magnetic tape (2), a magnetic-tape apparatus (1) has a drive arrangement (18) comprising at least one brake disc (37, 38) which is rotatable in opposite directions of rotation (30, 33, 27, 36) and which can be braked by a block-brake device (39, 40). The block-brake device (39, 40) includes a brake block (41, 42) arranged on a first level (43, 44), which first lever is pivotally connected to a second lever (47, 48) which is pivotable about a pivot (49, 50). A coupling is arranged between the two levers (43, 47, 44, 48) to provide a positive coupling during braking in one direction of rotation (33, 27) of the brake disc (37, 38), and the two levers are interconnected via a spring to provide a non-positive coupling during braking in the other direction of rotation (30, 36) of the brake disc (37, 38). A single spring rod (61, 62) performs the coupling and the spring functions and has both ends (63, 64, 65, 66) connected to the two levers (43, 47, 44, 48).

16 Claims, 2 Drawing Sheets

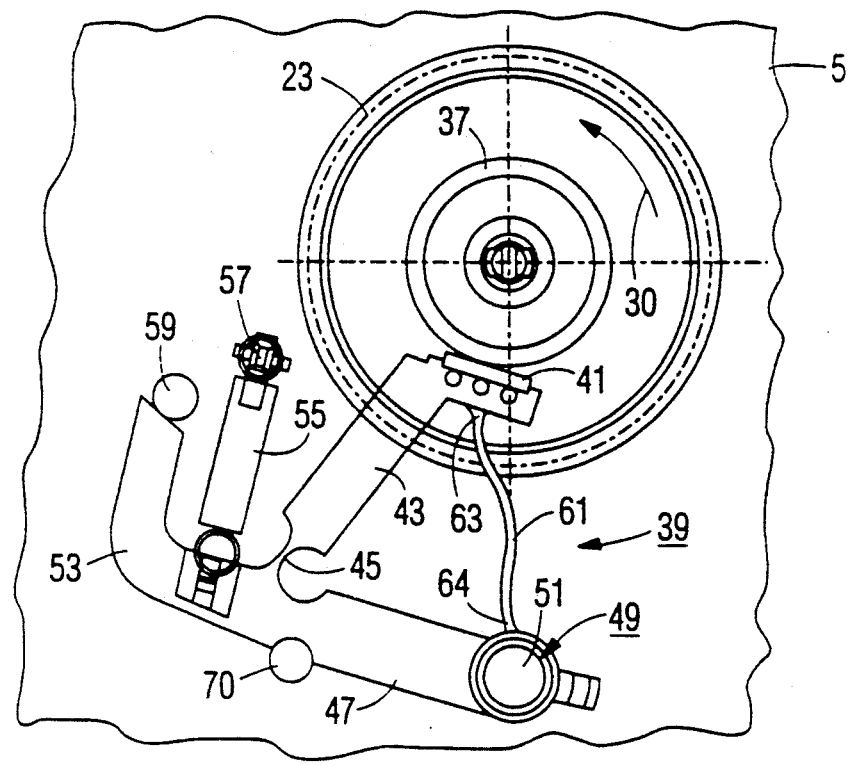
FIG. 2
FIG. 3
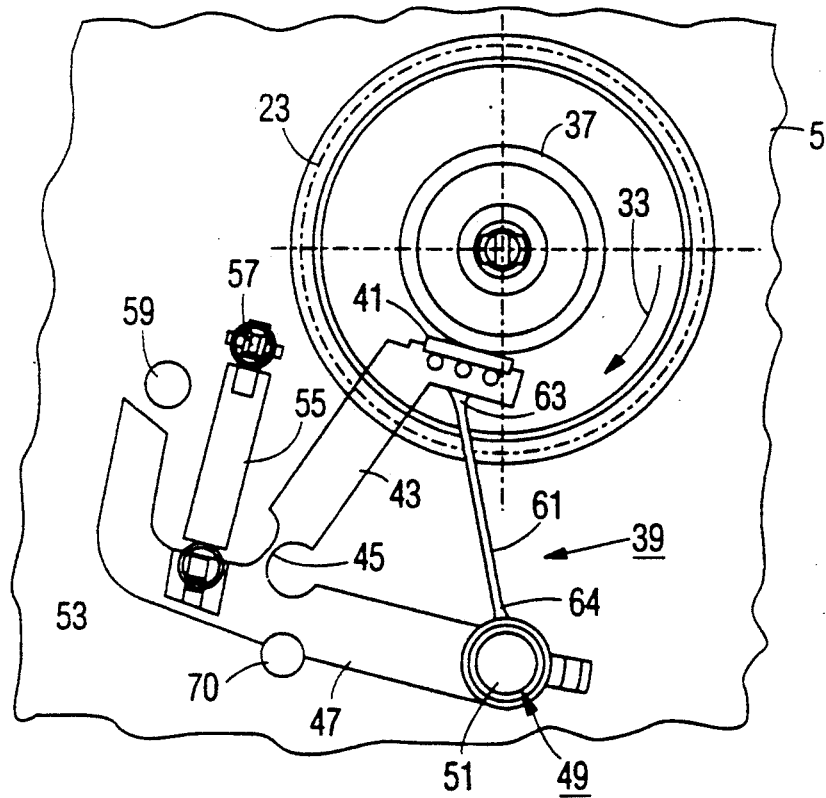

MAGNETIC TAPE APPARATUS HAVING A DIFFERENTIAL BRAKING MECHANISM WITH A BUCKLING SPRING MEMBER

BACKGROUND OF THE INVENTION

1. Field of the Invention

The invention relates to a magnetic-tape apparatus comprising a drive arrangement for driving the magnetic tape, which arrangement comprises at least one brake disc which is rotatable in opposite directions of rotation and a block-brake device for braking the brake disc, which device comprises a brake block which is adapted to cooperate frictionally with the brake disc and which is arranged on a first lever, which first lever is pivotally connected to a second lever which is pivotable about a pivot, a coupling means being arranged between the two levers to provide a positive coupling during braking in one direction of rotation of the brake disc, and the two levers being interconnected via a spring means to provide a non-positive coupling during braking in the other direction of rotation of the brake disc.

2. Description of the Prior Art

A magnetic-tape apparatus of the type defined in the opening paragraph is known from DE-AS 1,272,646. In this known apparatus the block-brake device comprises a separate coupling means between the two levers. This separate coupling means is constituted by a limb which is integral with and laterally projects from the second lever and which cooperates with the L-shaped first lever. Thus, the known apparatus requires the use of specially shaped or constructed levers. In addition, the known apparatus comprises a separate spring means arranged between the two levers. This separate spring means is constituted by a tension spring whose ends are attached to the two levers. As is known, such a tension spring exhibits a linear characteristic, i.e. the spring force of a tension spring is in principle directly proportional to the spring excursion, which in its turn depends on geometrical tolerances in the lever system formed by the two levers. However, as a result of this, the spring force and the braking torque, which is dependent on the spring force, depend to a comparatively large extent on geometrical tolerances. Moreover, it is to be noted that the spring force of such a tension spring is subject to substantial tolerances, so that the actual spring force may deviate to a comparatively large extent from a given nominal value, which is also unfavourable in order to obtain a specific desired braking torque.

SUMMARY OF THE INVENTION

It is the object of the invention to avoid the above problems and to provide a block-brake device of very simple construction in a magnetic-tape apparatus of the type defined in the opening paragraph, so as to guarantee with very simple means that this block-brake device produces a braking torque which is dependent on the spring force of the spring means, which is substantially independent of geometrical tolerances and which comparatively accurately corresponds to a given value.

To this end the invention is characterized in that for forming the coupling means and the spring means there is provided a single spring rod which is loaded substantially axially and which has both ends connected to the two levers. In this way it is achieved that the spring rod forms both the coupling means and the spring means and thus performs two functions, which is advantageous in order to simplify the construction of the braking device and to minimize the costs of the magnetic-tape apparatus. The provision of the substantially axially loaded spring rod, which forms a buckling spring and over a wide range exhibits a substantially constant spring force which is independent of the spring excursion and which is thus substantially independent of geometrical tolerances in the lever system, further has the advantage that the braking torque is always independent of geometrical tolerances, has a constant value and is dependent on the spring force of the spring rod. Moreover, such a spring rod has the advantage that in principle its spring force is comparatively independent of tolerances, which is favourable in order to obtain a specific braking torque. The provision of the spring rod is therefore advantageous for a reliable and rapid yet gentle braking of the brake disc and hence of the magnetic tape in a magnetic-tape apparatus in accordance with the invention.

The spring rod may be made of, for example, steel and may be connected to the two levers by means of screws. However, it is found to be advantageous if the spring rod is constructed as a plastics part. Such a spring rod constructed as a plastics part can be provided simply with interlocking coupling projections at its free ends, which projections are engageable with corresponding coupling recesses in the two levers.

However, it is found to be advantageous if the two pivotally interconnected levers and the spring rod, which has both ends connected to the levers, are combined to form a single one-piece plastics part. This results in a very simple construction for the block-brake device.

BRIEF DESCRIPTION OF THE DRAWINGS

An embodiment of the invention will be described in more detail, by way of non-limitative example, with reference to the drawings.

FIG. 2 is a plan view of one of the two block-brake devices of the magnetic-tape apparatus in FIG. 1, shown in its operating position during braking of the anticlockwise rotating brake disc.

FIG. 3 is a plan view of the block-brake device in FIG. 2, shown in its operating position during braking of the clockwise rotating brake disc.

DESCRIPTION OF THE PREFERRED EMBODIMENTS

Figure 1:
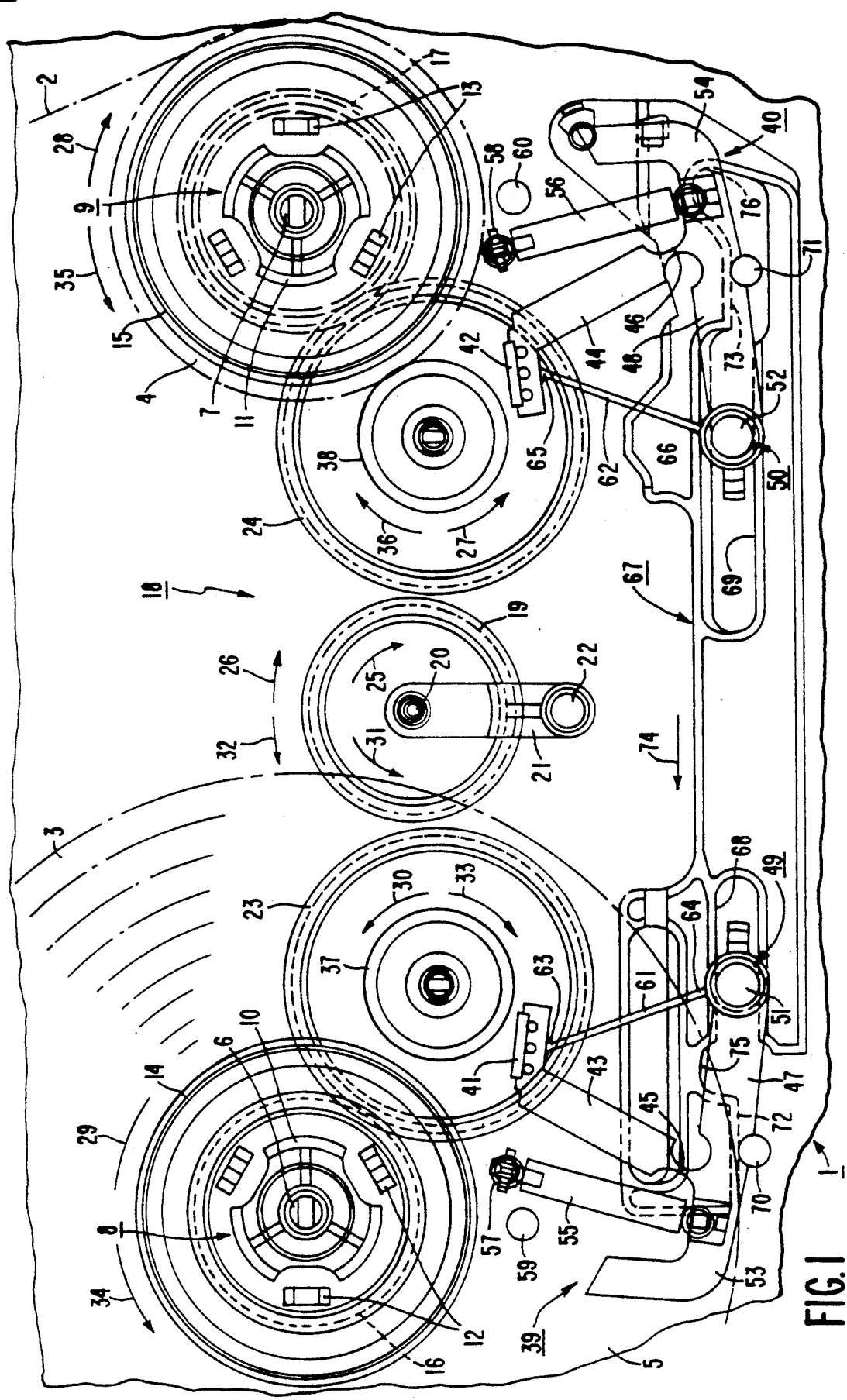
FIG. 1 is an enlarged-scale plan view of a relevant part of a magnetic-tape apparatus comprising a drive arrangement for the magnetic tape, which arrangement comprises two brake discs which can each be braked by means of a block-brake device in order to brake the magnetic tape, both block-brake devices being shown in their lifted rest positions.

FIG. 1 shows part of a magnetic-tape apparatus 1, into which a cassette, not shown, can be inserted in known manner. The cassette accommodates a magnetic tape 2 which extends between two spools of tape 3 and 4 each wound on a reel in the cassette, not shown. The two spools 3 and 4 of magnetic tape 2 are shown diagrammatically in dash-dot lines in FIG. 1. Hereinafter the spool 3 is referred to as the left-hand spool and the spool 4 as the right-hand spool.

The magnetic-tape apparatus 1 comprises a substantially plate-shaped chassis 5. By means of two stationary spindles 6 and 7 the chassis 5 carries two winding mandrels 8 and 9 for driving the reels carrying the spools 3 and 4 in the cassette, not shown. The winding mandrels 8 and 9 each comprise a centering portion 10 and 11 respectively for centering the reels and three coupling projections 12 and 13 respectively for the rotary drive of the reels and hence the spools 3 and 4. The centering portions 10 and 11 and the coupling projections 12 and 13 project from the two reel discs 14 and 15 respectively. At its underside each of the two reel discs 14 and 15 is connected to a reel-disc gear wheel 16 and 17 respectively. It is to be noted that the reel discs 14 and 15, the reel-disc gear wheels 16 and 17, the centering portions 10 and 11, and the coupling projections 12 and 13 respectively have been combined to form a single plastics part.

To drive the two winding mandrels 8 and 9 and thus the magnetic tape 2 the magnetic-tape apparatus 1 comprises a drive arrangement 18, shown partly. The drive arrangement 18 comprises a reversible motor, not shown, by means of which a drive wheel 19, shown in a neutral center position in FIG. 1, can be driven in opposite directions of rotation via a drive transmission, not shown, of the drive arrangement 18. The drive wheel 19 is rotatably supported on a lever 21 by means of a spindle 20, which lever is pivotably supported on the chassis 5 by means of a pivot 22. The drive wheel 19 is driven by means of a further gear wheel, not shown, of said drive transmission, which further gear wheel meshes with the drive wheel 19 at the side which is remote from the journal 22.

The lever 21 carries, for example, a felt disc, not shown in FIG. 1, which cooperates frictionally with one side face of the drive wheel 19. In this way it is achieved that depending on its direction of rotation the drive wheel 19 is automatically pivoted about the pivot 22 by means of the lever 21. The automatic pivotal movement of the drive wheel 19 enables this wheel to mesh selectively with one of two intermediate gear wheels 23 and 24, which are rotatably supported in the chassis 5. The intermediate gear wheel 23 is in mesh with the reel-disc gear wheel 16, which is coaxial with the left-hand winding mandrel 8, and the intermediate gear wheel 24 is in mesh with the reel-disc gear wheel 17, which is coaxial with the right-hand winding mandrel 9. In order to ensure a reliable automatic pivoting of the drive wheel 19 without a felt disc as mentioned above between the drive wheel 19 and the lever 21, the drive wheel 19 can be constructed in such a way, by a suitable choice of its outside diameter, that during its automatic pivotal movement between the intermediate gear wheels 23 and 24 the drive wheel 19 briefly meshes positively with the teeth of both intermediate gear wheels 23 and 24, and that after the pivotal movement the drive wheel 19 meshes with only one of the two intermediate gear wheels 23 and 24.

When the motor of the drive arrangement drives the drive wheel 19 in the clockwise direction indicated by the arrow 25 the drive wheel 19 is pivoted as indicated by the arrow 26, causing the drive wheel 19 to mesh with the intermediate gear wheel 24 and to drive this wheel in the anticlockwise direction indicated by the arrow 27. The intermediate gear wheel 24 then drives the reel-disc gear wheel 17 and the reel disc 15, and thus the spool 4, in the clockwise direction indicated by the arrow 28. For example, via the traction exerted by the magnetic tape 2, the left-hand spool 3 is then also driven clockwise as indicated by the arrow 29, so that the reel-disc gear wheel 16 then also rotates clockwise. The reel-disc gear wheel 16 then drives the intermediate gear wheel 23 anticlockwise as indicated by the arrow 30.

When the motor of the drive arrangement 18 drives the drive wheel 19 anticlockwise as indicated by the arrow 31 the drive wheel 19 is pivoted in the direction by the arrow 32, causing this wheel to mesh with the intermediate gear wheel 23 and drive it in the direction indicated by the arrow 33, i.e. clockwise. The right-hand reel 4 is then, for example, also driven anticlockwise as indicated by the arrow 35 via the traction exerted by the magnetic tape 2, so that the reel-disc gear wheel 17 also rotates anticlockwise. The reel-disc gear wheel 17 then drives the intermediate gear wheel 24 clockwise as indicated by the arrow 36.

Each of the two intermediate gear wheels 23 and 24 is integral with a coaxial brake disc 37 and 38 respectively. To brake each of the two brake discs 37, 38 and thus the winding mandrels 8, 9 and the tape spools 3, 4 the magnetic-tape apparatus 1 comprises a block-brake device 39 and 40 respectively. The two block-brake devices 39 and 40 are wholly identical but are arranged in mirror-inverted positions relative to one another in the magnetic-tape apparatus 1.

Each of the two block-brake devices 39 and 40 comprises a braking block 41 and 42 for the frictional cooperation with the associated brake disc 37 and 38 respectively. The brake blocks 41 and 42 are arranged on respective first levers 43 and 44. The first levers 43 and 44 are pivotally connected to respective second levers 47 and 48 via integral hinges 45 and 46 respectively. The pivots 49 and 50 comprise cylindrical pins 51 and 52 respectively which project from the respective second levers 47 and 48 and rotatably engage in bores, not shown in FIG. 1, in the chassis 5.

A spring in the form of a tension spring 55, 56 acts on the free angular end 53, 54 of the respective second lever 47, 48, the other end of the spring being attached to a projection 57, 58 of the chassis 5. The tension spring 55, 56 has a comparatively small spring force. This spring force may be, for example, approximately 1 to 2N. As is illustrated in FIGS. 2 and 3 for the block-brake device 39, the tension spring 55, 56 urges the brake block 41, 42 against the brake disc 37, 38 via the respective second lever 47 or 48 and the respective first lever 43 or 44, which is pivotally connected thereto, during braking in a direction of rotation 33 or 27 of the respective brake disc 37, 38, and the tension spring 55, 56 keeps the second lever 47, 48 against a pin-shaped stop 59 or 60, which projects from the chassis 5, during braking in the other direction of rotation 30 or 36 of the respective brake disc 37, 38.

A coupling device, which provides a positive coupling during braking in one direction of rotation 33 or 27 of the respective brake disc 37 or 38, is arranged between the two levers 43 and 47, and 44 and 48 respectively, and during braking in one direction of rotation 33 or 27 of the respective brake disc 37 or 38 it interlocks the two levers 43 and 47 or 44 and 48 to form a rigid lever structure which is pivotable about the respective pivot 49 or 50. Moreover, the two levers 43 and 47, or 44 and 48, are coupled via a spring means which provides a non-positive coupling during braking in the other direction of rotation 30 or 36 of the respective brake disc 37, 38, which spring means provides a non-positive coupling between the two levers 43 and 47, or 44 and 48, during braking in the other direction of rotation 30 or 36 of the respective brake disc 37, 38 and thereby urges the brake block 41 or 42 against the brake disc 37 or 38 via the respective first lever 43 or 44.

In order to realise said coupling device and said spring means in a very simple and advantageous manner each of the two block-brake devices 39 and 40 in the present magnetic-tape apparatus 1 comprises only one substantially axially loaded spring rod 61 or 62 respectively, having both ends 63, 64 or 65, 66 connected to the two respective levers 43, 47 or 44, 48. When loaded axially the spring rod 61 or 62 can buckle against a given buckling force which is defined by its construction as regards cross-section, length and material and which has a basically constant value which is substantially independent of the spring excursion. The spring rod 61, 62 has a comparatively large spring force. This spring force may be, for example, 20 to 25N. The spring rod 61, 62 is then made of a plastics. In the present case the two levers 43, 47 and 44, 48, which are pivotally connected by integral hinges 45 and 46 respectively, and the spring rod 61, 62, which has both ends 63, 64 or 65, 66 connected to the levers 43, 47 and 44, 48 respectively, are combined in a very simple manner to form a single one-piece plastics part. The brake block 41, 42 is also made of a plastics, for example a thermoplastic elastomer, which is processed together with the plastic material for the two levers 43, 47 and 44, 48 and the spring rod 61, 62 in a so-called two-component injection-moulding process.

The block-brake devices 39 and 40 are movable between a rest position, shown in FIG. 1, in which they are clear of the brake discs 37 and 38, and an operating position, shown in FIGS. 2 and 3 for one of the two block-brake devices, the brake discs to be braked having different directions of rotation in FIGS. 2 and 3. To keep the block-brake devices 39 and 40 in their rest positions or to enable them to be set to their operating positions, there is provided a control slide 67. The control slide 67 has two guide slots 68 and 69 which cooperate with the pins 51 and 52, the control slide 67 being guided for longitudinal movement by the pins 51 and 52. FIG. 1 shows the control slide 67 in its initial position. In this initial position of the control slide 67 a control pin 70 or 71, which projects from a respective one of the second levers 47 or 48 of the block-brake device 39 or 40, acts upon a stop surface 72 or 73 of the control slide 67 under the influence of the force exerted on the second lever 47 or 48 by the respective tension spring 55 or 56, so that the block-brake devices 39 and 40 are held in their rest positions.

In order to make the block-brake devices 39 and 40 operative, i.e. to enable them to be set to their operating positions, the control slide is moved from its initial position shown in FIG. 1 in the direction indicated by the arrow 74, for example by means of an electric motor or in another way, until the control pins 70 and 71 on the second levers 47 and 48 are situated at the location of recesses 75 and 76 in the control slide 67, the block-brake devices 39 and 40 being moved to their operating positions under the influence of tension springs 55 and 56 which act upon the second levers 47 and 48.

FIG. 2 shows the operating position occupied by the block-brake device 39 when it brakes the brake disc 37 which rotates in the direction indicated by the arrow 30. This corresponds to the situation obtained during braking of the brake disc 37 when previously the magnetic tape 2 was unwound from the left-hand spool 3. When the brake block 41 is applied to the brake disc 37 the brake block 41 is first frictionally moved in the direction of rotation corresponding to the arrow 30. The first lever 43 is then subjected to tensile stress and the spring rod 61 to compressive stress. This causes the spring rod 61 to buckle and the block-brake device 39 to be moved in such a way that the free end 53 of its second lever 47 abuts against the stop 59 under the influence of the tension spring 55. Under the influence of its spring force the buckled spring rod 61, which thus forms a non-positive coupling between the two levers 43 and 47, urges the brake block 41 against the brake disc 37 via the first lever 43, the braking torque during braking of the brake disc 37 in its direction of rotation indicated by the arrow 30 being dictated by the spring rod 61, which has been dimensioned to provide a substantial spring force. Since the spring force of the buckled spring rod 61 always exhibits a basically constant equal value independently of the spring excursion, the braking torque, which depends on the spring force of the spring rod 61, is thus always constant and substantially independent of geometrical tolerances. As can be seen in FIG. 2, the brake block 41 does not cooperate with the brake disc 37 in the non-retracting direction during this braking process, so that the influence of changes in friction on the braking torque is comparatively small. Once the brake disc 37 has been braked, i.e. when it has stopped, the spring rod 61 resumes its extended position, the second lever 47 being lifted off the stop 59 against the force of the tension spring 55. The braking device 39 then occupies the same position as shown in FIG. 3.

FIG. 3 shows the operating position of the block-brake device 39 when this device brakes the brake disc 37 rotating in the direction indicated by the arrow 33. This corresponds to the situation obtained during braking of the brake disc 37 when previously the magnetic tape 2 was wound onto the left-hand spool 3. When the brake block 41 is applied to the brake disc 37 the brake block 41 is then first moved by friction in the direction of rotation indicated by the arrow 33, the spring rod 61 between the two levers 43 and 47 being subjected to tensile stress and acting as a positive coupling device between the two levers 43 and 47 to interlock the two levers 43 and 47 such that they form a rigid lever structure which is pivoted about the pivot 49 against the force of the tension spring 55. The braking torque of the braking device 39 exerted on the brake disc 37 by the brake block 41 then depends on the spring force of the comparatively weak tension spring 55. As can be seen in FIG. 3, the brake block 41 neither cooperates with the brake disc 37 in the non-retracting direction during this braking process, so that the influence of changes in friction on the braking torque is also comparatively small in this operational situation.

We claim:
1. A magnetic tape apparatus having
   drive means for driving a magnetic tape,
   a brake disc rotatable in opposite directions of rotation, and
   a brake means for braking said brake-disc, said brake means including
      a first lever,
      a pivot,
      a second lever pivotable about said pivot, said first lever being pivotably connected to said second lever,
      a brake block arranged on said first lever for frictionally engaging said brake disc to brake said brake disc, a coupling means arranged between said first and second levers to provide a rigid coupling during braking in one direction of rotation of said brake disc, and a spring means interconnecting said two levers to provide a biasable coupling during braking in the other direction of rotation of said brake disc, wherein the improvement comprises:

a single spring rod extending between and having a respective end connected to each of said first and second levers comprises said coupling and spring means, said spring rod and said levers being arranged such that with said brake block frictionally engaged with said brake disc in one direction of rotation of said brake disc, said spring rod is loaded substantially axially in compression and is buckled, providing a substantially constant biasing force of said brake-block against said brake disc and a substantially constant braking torque, and such that in the opposite direction of rotation of said brake disc, said spring rod is loaded in tension and rigidly connects said two levers.

2. An apparatus as claimed in claim 1, characterized in that said spring rod is constructed as a plastic part.

3. An apparatus as claimed in claim 2, characterized in that said two pivotally interconnected levers and said spring rod, which has both ends connected to said levers, are combined to form a single one-piece plastic part.

4. A magnetic-tape cassette apparatus for a magnetic tape cassette, said apparatus comprising:
   a) a winding mandrel for driving a winding hub of a magnetic tape cassette;
   b) drive means for driving said winding mandrel in opposite directions of rotation said drive means including a brake disc rotatable in a first and a second, opposite direction of rotation; and
   c) a brake for braking said braking disc, said brake comprising:
      1) a first lever,
      2) a second lever pivotably mounted in said apparatus, said first lever being pivotably mounted on said second lever,
      3) a buckling spring rod extending between said first and second levers and having opposite ends each connected to a respective said lever,
      4) a brake block arranged on said first lever and frictionally engageable with said reel disc, and
      5) and biasing means for pivoting said second lever towards said brake disc such that said brake block engages said rod brake disc,
   said levers and said spring rod being arranged such that with said brake block frictionally engaged with said brake disc in said first direction of rotation said spring rod is loaded substantially axially in compression and is buckled, providing a substantially constant biasing force of said brake-block against said brake disc and a substantially constant braking torque, and such that in said second, opposite direction of rotation of said brake disc, said spring rod is loaded in tension and rigidly connects said two levers.

5. An apparatus as claimed in claim 4, characterized in that said spring rod is constructed as a plastic part.

6. An apparatus as claimed in claim 5, characterized in that said two pivotally interconnected levers and said spring rod, which has both ends connected to said levers, are constituted by a single one-piece plastic part.

7. A magnetic tape cassette apparatus according to claim 4, wherein:
   said second lever is pivotable about a pivot adjacent one end of said second lever;
   said biasing means comprises a tension spring connected to said second lever at a location spaced from said pivot and arranged for rotating said second lever, said first lever, and said brake block against said reel disc; and
   said tension spring has a substantially lower spring constant than said spring rod.

8. An apparatus as claimed in claim 7, characterized in that said spring rod is constructed as a plastic part.

9. An apparatus as claimed in claim 8, characterized in that said two pivotally interconnected levers and said spring rod, which has both ends connected to said levers, are constituted by a single one-piece plastic part.

10. A magnetic tape cassette apparatus according to claim 8, further comprising a stop towards which said tension spring pivots said second lever;
    said brake disc acting on said brake block in said first direction of rotation of said brake disc such that said first lever is in tension and pivots said second lever against said stop with said spring rod buckled, and in said second, opposite direction of rotation said brake disc acting on said brake block such that said spring rod is in tension and said second lever is displaced from said stop against the tension of said tension spring.

11. An apparatus as claimed in claim 10, characterized in that said spring rod is constructed as a plastic part.

12. An apparatus as claimed in claim 11, characterized in that said two pivotally interconnected levers and said spring rod, which has both ends connected to said levers, are constituted by a single one-piece plastic part.

13. A magnetic tape cassette apparatus for a tape cassette having a magnetic tape transportable between a pair of winding spools, said apparatus comprising:
    a) first and second spaced winding mandrels for driving respective winding spools of a tape cassette loaded in said apparatus;
    b) drive means for driving said winding mandrels in opposite directions of rotation, said drive means including a pair of drive wheels each arranged for driving a respective winding mandrel and a brake disc coupled to and coaxial with each drive wheel; and
    c) a respective brake for each one of said pair of drive wheels, each brake including a one-piece plastics part, a brake block, a pivot pin, and a tension spring;
    said one piece plastic part including first and second rigid lever portions and a buckling spring rod portion, said second lever portion being pivotable about said pivot near one end of said second lever portion, said first lever portion being pivotably connected to said second lever portion at a location spaced from said pivot and extending at an acute angle with respect to said second lever in the direction towards said pivot, said brake block being disposed on an end portion of said second lever, and said buckling spring rod portion extending between said end portion of said first lever and said second lever portion adjacent said pivot, and said tension spring being connected to said second lever portion at a location spaced from said pivot for pivoting said second lever towards, and said brake block on said end portion of said first lever against, said brake disc;

said pivots of said pair of brakes each being arranged with respect to a respective said brake disc such that in one direction of rotation of said brake disc, said brake disc acts on its respective brake block to pivot said second lever towards said brake disc and said first lever towards said second lever in the direction of said pivot and buckles said spring rod, in said buckled position said spring rod exerting a substantially constant force and said brake block exerting a substantially constant braking torque on said brake disc, and such that in the opposite direction of rotation of said brake disc, said brake disc acts on said brake block to pivot said first lever away from said second lever, putting said spring rod in tension, and urging said second lever away from said brake disc, said tension spring urging said second lever portion towards said brake disc such that said brake block remains in frictional contact with said brake disc;

said brakes being arranged in a mirror symmetric relationship such that with both of said winding wheels rotating in the same direction of rotation, one of said brakes has a rod spring in tension and the other of said rod springs is in compression; and d) control means for controlling the pivoting of said brakes against said brake discs.

14. A magnetic tape cassette apparatus according to claim 13, wherein said control means includes a control slide guidably translatable on said pivot pins, said control slide and said one-piece plastic brake parts including complimentary control surfaces arranged such that in one position of said slide said brake blocks are not engaged with said brake discs and in another position both of said slide said brake blocks are engaged with a respective one of said brake discs.

15. A magnetic tape cassette apparatus according to claim 14, further comprising a stop for limiting the pivoting of said second lever portion during rotation of said brake disc in said one direction of rotation.

16. A magnetic tape cassette apparatus according to claim 13, further comprising a stop for limiting the pivoting of said second lever portion during rotation of said brake disc in said one direction of rotation.

* * * * *